United States Patent [19]

Biallas et al.

[11] Patent Number: 5,752,327
[45] Date of Patent: May 19, 1998

[54] PARTICLE FLUIDIZATION METHOD AND APPARATUS THEREFOR

[75] Inventors: Bernd Biallas; Wolfgang Duschek, both of Münster; Wolfgang Mattmann; Klaus Hilligardt, both of Limburgerhof; Hans-Jacob Feindt, Ludwigshafen, all of Germany

[73] Assignee: BASF Aktiengesellschaft, Ludwigshafen, Germany

[21] Appl. No.: 563,626

[22] Filed: Nov. 28, 1995

[30] Foreign Application Priority Data

Dec. 8, 1994 [DE] Germany ............... 44 43 773.0

[51] Int. Cl.⁶ ..................................... F26B 3/08
[52] U.S. Cl. ............... 34/359; 34/364; 34/365; 34/589
[58] Field of Search .......... 34/576, 364, 359, 34/579, 323

[56] References Cited

U.S. PATENT DOCUMENTS

| | | | |
|---|---|---|---|
| 1,667,691 | 7/1928 | Smith | 34/579 |
| 4,421,523 | 12/1983 | Mehta et al. | 48/197 R |
| 4,593,477 | 6/1986 | Dziubakowski et al. | 34/359 |
| 5,175,942 | 1/1993 | Dutta et al. | 34/359 |
| 5,254,168 | 10/1993 | Littman et al. | 118/666 |
| 5,297,622 | 3/1994 | Brannstrom et al. | 165/104.16 |
| 5,579,588 | 12/1996 | Reh et al. | 34/359 |

FOREIGN PATENT DOCUMENTS

| | | |
|---|---|---|
| 0 093 801 | 11/1983 | European Pat. Off. . |
| 0 112 105 | 6/1984 | European Pat. Off. . |
| 0 042 241 | 2/1985 | European Pat. Off. . |
| 0 233 787 | 8/1987 | European Pat. Off. . |
| 39 25 476 | 3/1990 | European Pat. Off. . |

Primary Examiner—Henry A. Bennett
Assistant Examiner—Pamela A. O'Connor
Attorney, Agent, or Firm—Oblon, Spivak, McClelland, Maier & Neustadt, P.C.

[57] ABSTRACT

Particle fluidization method in which particles are swirled up by a flow of a fluidizing gas to form a fluidized bed and pressure measurements are performed in or along the fluidized bed, and in which a parameter for the distribution of the measured values from these pressure measurements is determined and is used as a basis for regulating the flow rate of the stream of fluidizing gas.

16 Claims, 2 Drawing Sheets

PARTICLE FLUIDIZATION METHOD AND APPARATUS THEREFOR

The present invention relates to a particle fluidization method and to an apparatus for its implementation. The intention in particular is to produce a fluidized bed of powder coating particles.

Powder coatings are becoming increasingly important in industrial practice. In order to obtain satisfactory coatings, one of the problems which needs to be solved is that of achieving uniform fluidization of powder coatings. For applying powder coatings, powder coating material is removed by suction, under reduced pressure, from a powder container and is passed via a conveying line to a metering element.

Both fluctuations which occur randomly and as a result of the equipment used, and the recycling of overspray, can result in an uncontrolled change in the state of fluidization.

This problem can be solved by the development of more effective methods of and devices for fluidization. However, this does nothing to alleviate the fundamental disadvantage that those fluctuations which lead to nonuniform application of the coating material become evident only after the coating particles have been applied, from the unsatisfactory coating obtained.

In EP 0 042 241, a radioactive source is mounted inside the powder container, and the intensity of radiation is measured by detectors on the container wall. Changes in the state of fluidization are then deduced from the fluctuations in the intensity of radiation. This procedure, however, enables only a rough determination of the phase state. Moreover, regulations concerning protection against radiation complicate the application of the procedure.

A different process for recognizing relatively large abnormalities is described in EP 0 233 787. In this process, a pressure signal is measured at a site within the fluidized bed and is converted into a frequency spectrum with the aid of a Fourier transformation. Then, on the basis of the Fourier spectrum and of appropriate experience, it is possible to interpret the state of fluidization within the reactor. A disadvantage here is the considerable effort associated with adjustment and evaluation.

It is an object of the present invention to provide a method of particle fluidization in which the state of fluidization of the particles is determined and controlled simply. It is a further object of the present invention to provide an apparatus for implementing the method.

We have found that this object is achieved in accordance with the invention by the methods and apparatus defined in the claims.

In the method defined in the claims, particles are swirled up by a stream of a fluidizing gas to form a fluidized bed, and the pressure is measured in or along the fluidized bed. A parameter for the distribution of the measured values from these pressure measurements is then determined and, on the basis of this parameter, the flow rate of the stream of fluidizing gas is regulated. The parameter for the distribution of the measured values is preferably their standard deviation. The fluidized particles are preferably powder coating particles.

In a preferred method the pressure is measured using measuring sensors which are installed along the fluidized bed in pressure lines which are flushed with a volume flow of gas. This measure prevents instances of sticking and blockages in the pressure lines, which would adversely affect the results of the pressure measurements. Preferably, a differential pressure is measured between two or more points in the fluidized bed or between one point in the fluidized bed and an external reference pressure. An external reference pressure of this kind can be used in particular when the measuring sensors are accommodated in gas-flushed pressure lines. This enables the use of measuring devices which respond very sensitively to relatively small changes in pressure and which are thus protected from the high pressure in the fluidized bed. In this context, a particularly preferred embodiment is that in which the external reference pressure is matched to a changing mean pressure in the fluidized bed. Such is pressure changes can occur as a result of pressure fluctuations in the pump system, and in the measurement of a reference pressure can make it necessary to reduce the sensitivity of measurement.

The novel apparatus for implementing the method as claimed in one of the method claims comprises a container for a fluidized bed, and at least one measuring sensor for measuring the pressure in or along this fluidized bed. Also provided is a computing unit for determining a parameter for the distribution, in particular for the standard deviation of the measured values from the pressure measurements. A control unit then takes over the control of the flow rate of the stream of fluidizing gas on the basis of the parameter determined by the computing unit.

The measuring sensors are preferably installed along the fluidized bed in pressure lines which are flushed with a volume flow of gas. Further preference is given to measuring sensors which are accommodated along the fluidized bed in such a way that they permit measurements to be made of the differential pressure between two or more points in the fluidized bed or between one point in the fluidized bed and an external reference pressure. In a preferred embodiment, a regulating unit is provided which matches the external reference pressure to a changing mean pressure in the fluidized bed.

The invention is now described in detail with reference to FIGS. 1 and 2, in which.

Figure 1:
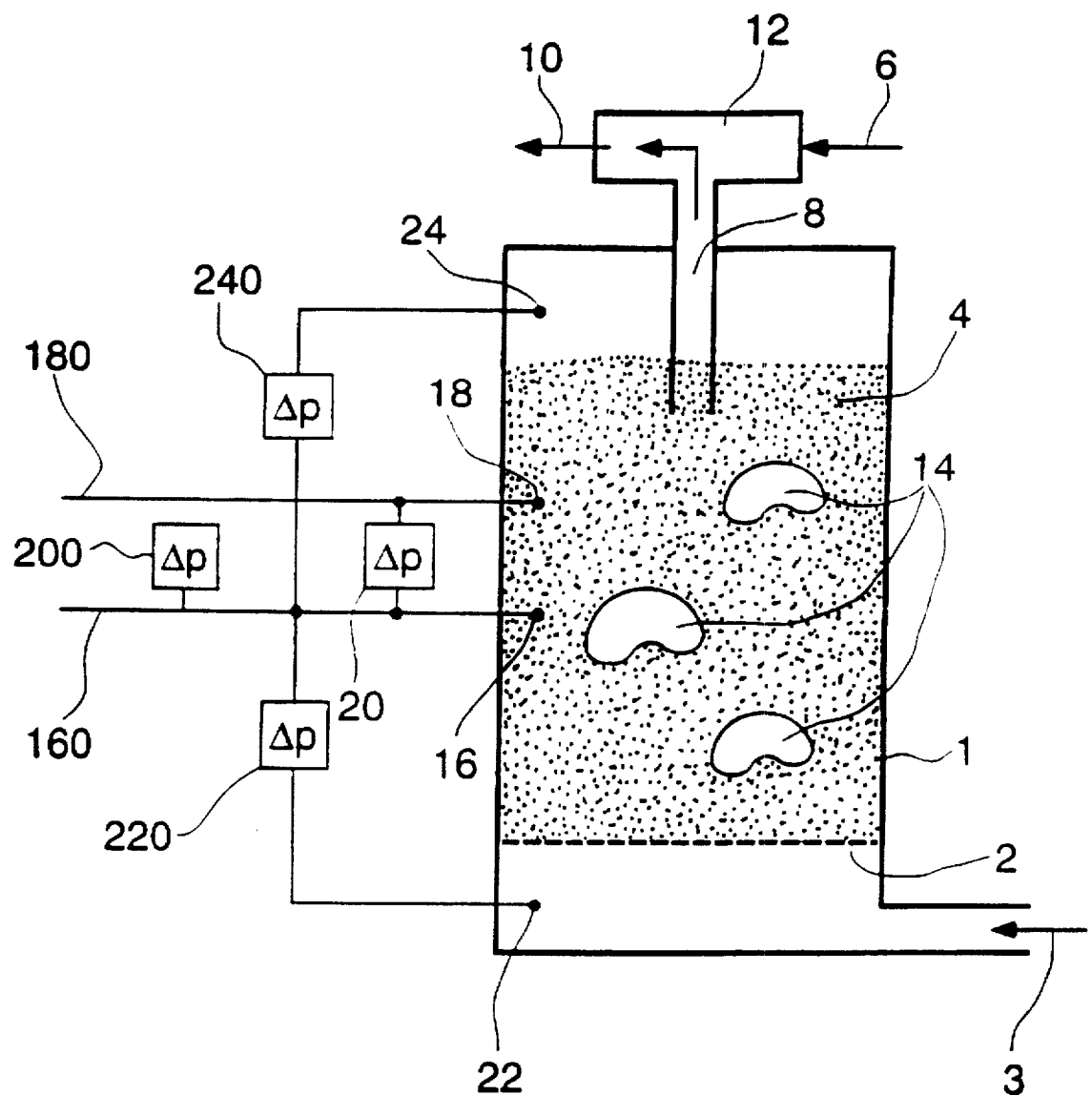
FIG. 1 shows a diagrammatic embodiment of the invention.

In FIG. 1, particulate coating material is located in a container 1 on a perforated distributing plate 2. A gas stream 3 converts the particulate coating material into a gas-solid suspension phase 4 or a fluidized particle bed 4.

The gas-solid particle suspension phase 4 is sucked out with the aid of a gas stream 6 via a suction pipe 8, is mixed with the gas stream 6 and is discharged from the suction and mixing chamber 12 as a powder coating stream 10 to, for example, a paint spraygun. This powder coating stream 10 should have as constant and homogenous a composition as possible in order to provide a homogenous paint spray jet.

In the course of the initial fluidization of the coating particles in the chamber 1 it is possible in practice for inhomogeneities 14 to occur, which may constitute agglomerations or gas bubbles. Such inhomogeneities 14 can result in the powder coating stream 10 in the mixing chamber 12 being irregular in form and being uneven.

The apparatus is provided with pressure-sensitive measuring sensors which are able to determine such inhomogeneities 14. In the embodiment shown in FIG. 1, two pressure sensors 16 and 18 are provided approximately in the middle of the fluidizing chamber 1. The two sensors emit signals, corresponding to the pressure prevailing therein, to a comparator 20 which is able in particular to produce, store and display a differential pressure signal. Given appropriate spacing of the sensors and a suitable size and distribution of the inhomogeneities, it is also possible by this means to detect and observe the movement of the inhomogeneities.

In accordance with the invention the measured values from the pressure measurements which have been undertaken are used to determine a parameter for the distribution of these measured values, preferably the standard deviation. It is on the basis of this parameter that the flow rate of the fluidizing gas stream is subsequently regulated.

Figure 2:
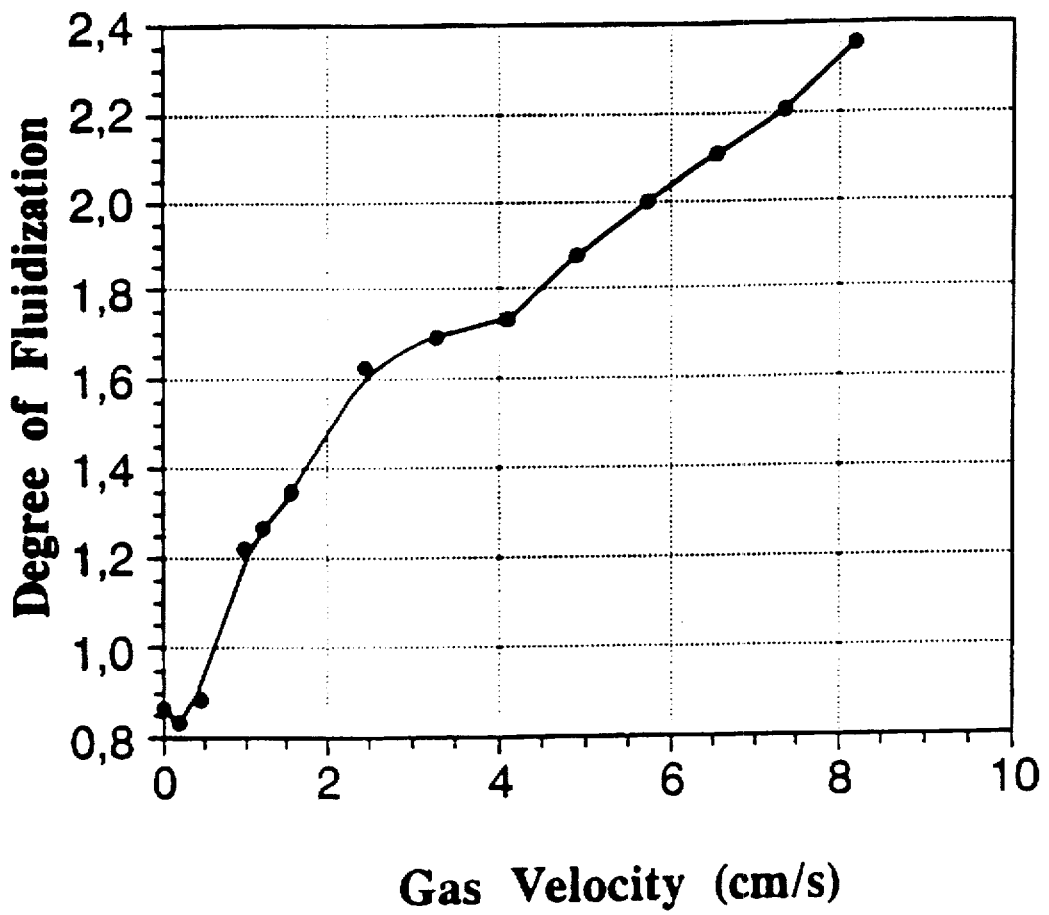
FIG. 2 shows the degree of fluidization of the particles as a function of the flow rate of the volume flow of gas.

FIG. 2 illustrates the connection between the flow rate of the fluidizing gas and the state of the fluidized bed. This figure plots the is degree of fluidization in the suspension phase 4 as a function of the flow rate of the gas stream 3 for a powder of specific particle size. The degree of fluidization designated is the standard deviation of the pressure fluctuations. It can be seen that the degree of fluidization of the particles, ie. the homogeneity of the suspension phase, is increased by raising the flow rate of the gas in the volume flow 3.

The present invention therefore makes it possible to establish and maintain a defined state of fluidization, even when the particle size, and thus the relationship between degree of fluidization and gas flow rate, is unknown, by using the parameter for the pressure fluctuations, for example their standard deviation, to regulate the flow rate of the volume flow 3 of gas.

In the preferred embodiment of the invention, the pressure sensors 16 and 18 are cleaned with the aid of a flushing gas which is fed in via lines 160 and 180, respectively. This gas prevents the pressure sensors being contaminated by a buildup of particles, for example coating particles, in such a way that erroneous values are measured. Moreover, it is possible in the flushing-gas lines to build up a reference pressure, so that the difference between the pressure prevailing at the measurement point 16 and the reference pressure in the line 160 can be determined, for instance, with a comparator or pressure meter 200.

Furthermore, the apparatus shown in FIG. 1 has pressure sensors 22 and 24 in the region of the gas inlet and, respectively, in the area above the suspension phase 4. The pressure signals emitted by these pressure sensors 22 and 24 are fed respectively to comparators 220 and 240. These two comparators, 220 and 240, are also supplied with the measurement signal emitted by the pressure sensor 16. The comparators 220 and 240 generate, store and, if appropriate, display a signal which corresponds to the difference between the pressures at the measurement sites 16 and 22 and, respectively, 16 and 24.

At the measurement points 16, 18, 22 and 24 it is also possible, instead of sensors, to provide simple pressure lines which conduct the pressure at the measurement points to the comparators or pressure meters 20, 200, 220 or 240 and in which a reference pressure can be built up. The recorded pressure fluctuations are a measure of the constancy over time, and therefore the homogeneity, of the powder coating stream. If the parameter for the distribution of the pressure fluctuations is outside the predetermined range, then it is possible firstly to interrupt the gas stream 10, which leads for example to a paint spraygun. Secondly, it is possible to increase the gas flow rate in the volume flow 3 on the basis of the parameter. It is also possible to take other measures, such as the activation of a prefluidizing operation.

We claim:

1. A particle fluidization method for providing a homogenous particle stream comprising the steps of:

swirling up particles by a stream of a fluidizing gas to form a fluidized bed;

performing pressure measurements in or along said fluidized bed;

determining a parameter for the distribution of measured values from said pressure measurements;

regulating the flow rate of the stream of fluidizing gas on the basis of said parameter; and sucking out and discharging said particles from said fluidized bed as said homogenous particle stream.

2. A method as claimed in claim 1, wherein the parameter is the standard deviation of the measured values.

3. A method as claimed in claim 1, wherein the fluidized particles are powder coating particles.

4. A method as claimed in claim 1, wherein the pressure measurement is carried out using measuring sensors which are installed along the fluidized bed in pressure lines which are flushed with a volume flow of gas.

5. A method as claimed in claim 1, wherein the differential pressure is measured between two or more points in the fluidized bed.

6. A method as claimed in claim 5, wherein the external reference pressure is matched to a changing mean pressure in the fluidized bed.

7. An apparatus for implementing the method as claimed in claim 1, having a container for a fluidized bed, which comprises at least one measuring sensor for measuring the pressure in or along the fluidized bed, a computing unit for determining a parameter for the distribution, in particular for the standard deviation of the measured values from the pressure measurements, a control unit for controlling the flow rate of the stream of fluidizing gas on the basis of the parameter determined by the computing units suction pipe connected to a suction and mixing chamber and a gas stream cooperating with said suction and mixing chamber to perform the suction and mixing operations.

8. An apparatus as claimed in claim 7, which has measuring sensors installed along the fluidized bed in pressure lines which are flushed with a volume flow of gas.

9. An apparatus as claimed in claim 7, which has measuring sensors along the fluidized bed for performing a measurement of the differential pressure between two or more points in the fluidized bed.

10. An apparatus as claimed in claim 9, which has a regulating unit for matching the external reference pressure to a changing mean pressure in the fluidized bed.

11. An apparatus as claimed in claim 7, which has measuring sensors along the fluidized bed for performing a measurement of the differential pressure between one point in the fluidized bed and an external reference pressure.

12. A particle fluidization method as claimed in claim 1, wherein the fluidized particle bed is sucked out with the aid of a gas stream via a suction pipe, is mixed with this gas stream in a suction and mixing chamber and is discharged from the suction and mixing chamber as a particle stream.

13. A particle fluidization method as claimed in claim 1, wherein the particle stream is interrupted when the parameter for distribution of the pressure fluctuations is outside a predetermined range.

14. A particle fluidization method as claimed in claim 1, wherein the flow rate of the fluidizing gas is increased when the parameter for distribution of the pressure fluctuations is outside a predetermined range.

15. A particle fluidization method as claimed in claim 1, wherein firstly the particle stream is interrupted when the parameter for distribution of the pressure fluctuations is outside a predetermined range and secondly the flow rate of the fluidizing gas is increased on the basis of this parameter.

16. A method as claimed in claim 1, wherein the differential pressure is measured between one point in the fluidized bed and an external reference pressure.

* * * * *